(12) United States Patent　　(10) Patent No.:　US 12,660,760 B2
Hol et al.　　(45) Date of Patent:　Jun. 23, 2026

(54) SQUARE BALER

(71) Applicant: Kuhn-Geldrop BV, Geldrop (NL)

(72) Inventors: Jan Johannes Judocus Hol, Boekel (NL); Dionisius Cornelis Maria Akkermans, Roosendaal (NL); Sjir Hendrick Margo Vaessen, Eindhoven (NL)

(73) Assignee: Kuhn-Geldrop BV, Geldrop (NL)

( * ) Notice: Subject to any disclaimer, the term of this patent is extended or adjusted under 35 U.S.C. 154(b) by 383 days.

(21) Appl. No.: 18/451,562

(22) Filed: Aug. 17, 2023

(65) Prior Publication Data

US 2024/0057526 A1　　Feb. 22, 2024

(30) Foreign Application Priority Data

Aug. 17, 2022　(GB) ...................................... 2212003

(51) Int. Cl.
　A01F 15/10　　(2006.01)
　A01F 15/04　　(2006.01)
　A01F 15/08　　(2006.01)
(52) U.S. Cl.
　CPC ............ A01F 15/101 (2013.01); A01F 15/04 (2013.01); A01F 15/042 (2013.01);
　(Continued)
(58) Field of Classification Search
　CPC .... A01F 15/01; A01F 15/042; A01F 15/0841; A01F 2015/102; A01F 15/04; A01F 15/10; A01F 15/0825
　See application file for complete search history.

(56) References Cited

U.S. PATENT DOCUMENTS

| 4,644,862 A | 2/1987 | Young |
| 2003/0159421 A1* | 8/2003 | Trelstad .............. A01F 15/0841 |
| | | 56/341 |

(Continued)

FOREIGN PATENT DOCUMENTS

| EP | 1 340 421 A1 | 9/2003 |
| EP | 3 020 267 A1 | 5/2016 |

(Continued)

OTHER PUBLICATIONS

Great Britain Combined Search and Examination Report issued Jan. 26, 2023 in Great Britain Application 2212003.4 filed on Aug. 17, 2022, 7 pages.

(Continued)

*Primary Examiner* — Brad Harcourt
(74) *Attorney, Agent, or Firm* — Oblon, McClelland, Maier & Neustadt, L.L.P.

(57)　　　　　ABSTRACT

A square baler includes a compression chamber, a reciprocating plunger configured to compress bale material in the compression chamber to make a square bale, and a feeding system configured to feed bale material into the compression chamber. The feeding system includes a feeding duct having an input end and an output end, a feeding fork configured to perform a loading stroke to pre-compress bale material in the feeding duct and a feeding stroke to transfer bale material from the feeding duct into the compression chamber. A drive mechanism is provided for driving movement of the feeding fork. The drive mechanism is adjustable to control the length and/or the speed of the loading stroke.

16 Claims, 7 Drawing Sheets

(52) U.S. Cl.
 CPC ...... *A01F 15/0825* (2013.01); *A01F 15/0841*
 (2013.01); *A01F 15/10* (2013.01); *A01F*
 *2015/102* (2013.01)

(56) References Cited

U.S. PATENT DOCUMENTS

| | | | |
|---|---|---|---|
| 2012/0204740 A1 | 8/2012 | Bergmann | |
| 2013/0104512 A1 | 5/2013 | Duenwald et al. | |
| 2015/0296716 A1* | 10/2015 | Verhaeghe | A01F 15/04 |
| | | | 56/432 |
| 2016/0192592 A1* | 7/2016 | Dumarey | A01F 15/101 |
| | | | 56/341 |
| 2018/0310483 A1 | 11/2018 | Bonte | |
| 2019/0059230 A1 | 2/2019 | Lang et al. | |

FOREIGN PATENT DOCUMENTS

| | | |
|---|---|---|
| EP | 3 456 177 A1 | 3/2019 |
| NL | 1037453 C2 | 5/2011 |
| WO | WO 2011/012457 A1 | 2/2011 |

OTHER PUBLICATIONS

Extended European Search Report issued Feb. 2, 2024, in corresponding European Patent Application No. 23191659.4, 7 pages.

* cited by examiner

SQUARE BALER

BACKGROUND OF THE INVENTION

Field of the Invention

The present invention relates to a square baler. The phrase "square baler" as used herein refers to a baler with reciprocating plunger that compresses bale material in an elongate compression chamber to form a parallelepiped bale (generally called a "square bale"). Square balers of this general type are well known, examples being described in EP0870425, EP1284594 and EP3078257. This type of square baler is typically used for baling agricultural crop material, for example grass, straw etc, although it may also be used for baling non-agricultural materials.

Description of the Related Art

In a typical agricultural square baler the bale material is picked up from the windrows in a field by a pick-up mechanism and optionally may be transported and cut by a rotor before being deposited and partially compressed by the feeding system in a prechamber/feeding duct. The feeding duct temporarily stores the gathered and partially compressed bale material. When a sufficient quantity of bale material has been gathered and when the reciprocating plunger is in the retracted position the feeding system brings the gathered and pre-compacted bale material from the feeding duct into the compression chamber in front of the plunger. The plunger then moves forward into the compression chamber and compacts the bale material and simultaneously shifts the compressed mass of bale material further along the compression chamber. When a sufficient quantity of bale material has been compressed in the compression chamber, twine loops are passed around the bale material and tied to keep the material under compression and to form a square bale. The completed bale leaves the bale chamber at the end of the compression channel by the continuous forward shifting of newly formed bales in the compression chamber.

A feature of the feeding systems described in EP0870425 and EP1284594 is that the feeding mechanism can perform:

A. one or more loading strokes in which the bale material is forwarded from the entrance of the feeding duct towards the exit of the feeding duct, whereby it pre-compresses the bale material in the feeding duct, and B. a feeding stroke whereby the pre-compressed bale material is transferred from the feeding duct into the compression chamber.

Typically the feeding system runs at two or more times the rate of the plunger, so that there will always be at least one loading stroke between successive feeding strokes. A feeding stroke will be performed only when a sufficient quantity of bale material is sensed in the feeding duct. If a sufficient quantity of bale material is not sensed in the feeding duct, another loading stroke will be performed to load more bale material into the feeding duct.

The feeding system and the plunger are synchronised so that the feeding system will only feed bale material from the feeding duct into the compression chamber when the reciprocating plunger is in the retracted position. If the plunger is not in the retracted position the feeding system will continue to perform the loading cycle until the plunger reaches the retracted position.

The materials to be baled may have very different and variable properties, including for example friction, elasticity, and specific mass. As a result, the shape of the portion of pre-compressed bale material transferred from the feeding duct into the compression chamber can be unpredictable and non-uniform. This can affect the shape of the bale, resulting in unsatisfactory non-uniform or oddly-shaped bales.

At least one technical problem with which the present invention is concerned relates to the reliable formation of uniform parallelopiped bales for a range of bale materials having different and variable properties.

The problem of non-uniform bale formation has been addressed in the prior art.

In EP3078257 the problem is addressed by adjusting the timing of the feeding mechanism.

In EP2496069 the problem is addressed by modifying the loading stroke by adjusting the joints of the feeding mechanism in a rather complicated fashion.

BRIEF SUMMARY OF THE INVENTION

It is an object of the present invention to provide a baler that resolves or at least mitigates one or more of the aforesaid problems.

According to one aspect of the present invention there is provided a square baler comprising a compression chamber, a reciprocating plunger configured to compress bale material in the compression chamber to make a square bale, and a feeding system configured to feed bale material into the compression chamber, the feeding system comprising a feeding duct having an input end and an output end, a feeding fork configured to perform a loading stroke to pre-compress bale material in the feeding duct and a feeding stroke to transfer bale material from the feeding duct into the compression chamber, and a drive mechanism for driving movement of the feeding fork, wherein the drive mechanism is adjustable to control the length and/or the speed of the loading stroke. The present invention enables the correct preparation of pre-compressed bale material in the feeding duct, leading to well-shaped, uniform bales. This advantage is achieved by controlling or adjusting the shape and/or the speed of the loading stroke to compensate for bale materials having different and variable properties.

According to another aspect of the invention there is provided a square baler.

The square baler can comprise a compression chamber.

The square baler can comprise a reciprocating plunger configured to compress bale material in the compression chamber to make a square bale.

The square baler can comprise a feeding system configured to feed bale material into the compression chamber. The feeding system can comprise a feeding duct having an input end and an output end. The feeding system can include a feeding fork. The feeding fork can be configured to perform a loading stroke to pre-compress bale material in the feeding duct. The feeding fork can be configured to perform a feeding stroke to transfer bale material from the feeding duct into the compression chamber. The feeding system can include a drive mechanism for driving movement of the feeding fork. The drive mechanism can be adjustable to control the length and/or the speed of the loading stroke.

Optionally, the drive mechanism comprises a feeding fork crank that is connected directly to the feeding fork and a steering arm crank that is connected to the feeding fork through a first steering arm, a swing arm mounted on a swing arm pivot, and a second steering arm. This mechanism enables reliable and efficient driving of the feeding fork through the loading stroke and the feeding stroke.

Optionally, during the loading stroke the feeding fork crank and a steering arm crank both rotate, and during the feeding stroke the feeding fork crank rotates and the steering arm crank does not rotate. This novel drive mechanism is different to that described for example in EP0870425, in which the steering arm crank is driven via a one-turn coupling that rotates to perform a feeding stroke and does not rotate while the loading stroke is performed.

Optionally, the feeding fork crank and the steering arm crank are driven from an input shaft of the baler, for example from the main drive input shaft that takes drive from the PTO of a tractor, thus avoiding the need for a secondary drive motor to drive one or more of the cranks.

Optionally, the steering arm crank is connected to the input shaft via a clutch mechanism, for example a one turn coupling. The clutch mechanism is engaged during the loading stroke causing the steering arm crank to rotate, and disengaged during the feeding stroke so that the steering arm crank does not rotate.

Optionally, the drive mechanism includes a drive adjustment mechanism for adjusting the drive connection between the steering arm crank and the swing arm to control the length and/or position of the loading stroke and/or the feeding stroke. This allows the length and/or the speed of the loading stroke and/or the feeding stoke to be adjusted easily to ensure correct and uniform bale formation with different or variable bale materials.

Optionally, the drive adjustment mechanism comprises adjustment components for adjusting one or more of:

the length (d) of the first steering arm;

the radial position (b) relative to the steering arm crank of a joint A between the first steering arm and the steering arm crank;

the radial position (c) relative to the swing arm pivot of a joint B between the first steering arm and the swing arm;

the circumferential position (a) relative to the swing arm pivot of the joint B between the first steering arm and the swing arm.

These adjustments may be applied individually or in combination to adjust the length and/or the speed of the loading stroke and/or the feeding stroke.

Optionally, the drive mechanism is configured to drive the feeding fork at a non-uniform speed. This allows the speed of the feeding fork to be increased during the loading stroke to ensure good preparation of the pre-compressed bale material in the feeding duct by throwing the bale material upwards towards the output end of the feeding duct.

Optionally, the drive mechanism is configured to drive the feeding fork at a relatively fast speed during the loading stroke and a relatively slow speed during the feeding stroke.

Optionally, the drive mechanism includes an asynchronous drive mechanism configured to convert a uniform input speed into a varying output speed. This enables the drive mechanism to drive the feeding fork at a relatively fast speed during the loading stroke and a relatively slow speed during the feeding stroke.

Optionally, the asynchronous drive mechanism includes an adjustment mechanism for adjusting the variation in the output speed of the asynchronous drive mechanism, for example to increase the speed of the feeding fork during the loading stroke and to decrease the speed during the feeding stroke.

Optionally, the asynchronous drive mechanism comprises an offset drive mechanism comprising first and second cranks with offset axes of rotation and a connecting arm that connects the first and second cranks and transmits rotational drive between them. This mechanism is simple and reliable. Alternatively a different asynchronous drive mechanism may be used, for example a Cardan joint.

Optionally, the adjustment mechanism adjusts the offset between the axes of the first and second cranks to adjust the variation in the output speed of the asynchronous drive mechanism. This provides a simple and effective mechanism for adjusting the variation in the output speed.

We have discovered that the problem of non-uniform bale formation can be addressed by ensuring the correct preparation of pre-compressed bale material in the feeding duct. We have discovered that correct preparation of pre-compressed bale material can be achieved by controlling the shape and/or the speed of the loading stroke to compensate for bale materials having different and variable properties. The present invention provides a mechanism for controlling the shape and/or the speed of the loading stroke and makes it possible to achieve good preparation of the pre-compressed bale materials in the feeding duct, thus leading to better-shaped and uniform bales. Optionally, the shape and/or the speed of the feeding stroke may also be adjusted.

The advantages provided by the present invention result are achieved in part by repositioning the joint between the first steering arm and the intermediate swing arm. This allows the end position of the loading stroke to be adjusted, thereby creating more or less space behind the loading stroke to provide for less or more precompression of the bale material, or to collect more or less bale material during successive loading strokes. The forward or starting position of the loading stroke is not significantly affected by the adjustment to the end position of the loading stroke.

Optionally, the end/top position of the feeding stroke can be adjusted easily by changing the length of first steering arm. Changing the length of the first steering arm will only slightly affect the forward/starting position of the feeding stroke. Changing the forward/starting position is not wanted because it could affect the cooperation between the feeding system and the bale material supply mechanism (the pick-up mechanism and/or the cutting/forwarding rotor). This provides the advantage that the wad of bale material fed into the compression chamber can be placed at different heights in front of the plunger so as to control the distribution of bale material in the upper and lower parts of the compression chamber.

Optionally, the feeding fork may be driven along the feeding duct at a high speed during the loading stroke and at a lower speed during the feeding stroke. The faster loading stroke ensures good preparation of the pre-compressed bale material in the feeding duct by throwing the bale material upwards towards the output end of the feeding duct. If two or more loading strokes take place successively, the first loading stroke may be faster to throw bale material towards the output end of the bale feeding duct and the second loading stroke may be slower to compress more bale material behind the first wad of bale material

BRIEF DESCRIPTION OF THE SEVERAL VIEWS OF THE DRAWINGS

An embodiment of the invention will now be described by way of example, with reference to the accompanying drawings, in which.

DETAILED DESCRIPTION OF THE INVENTION

Figure 1:
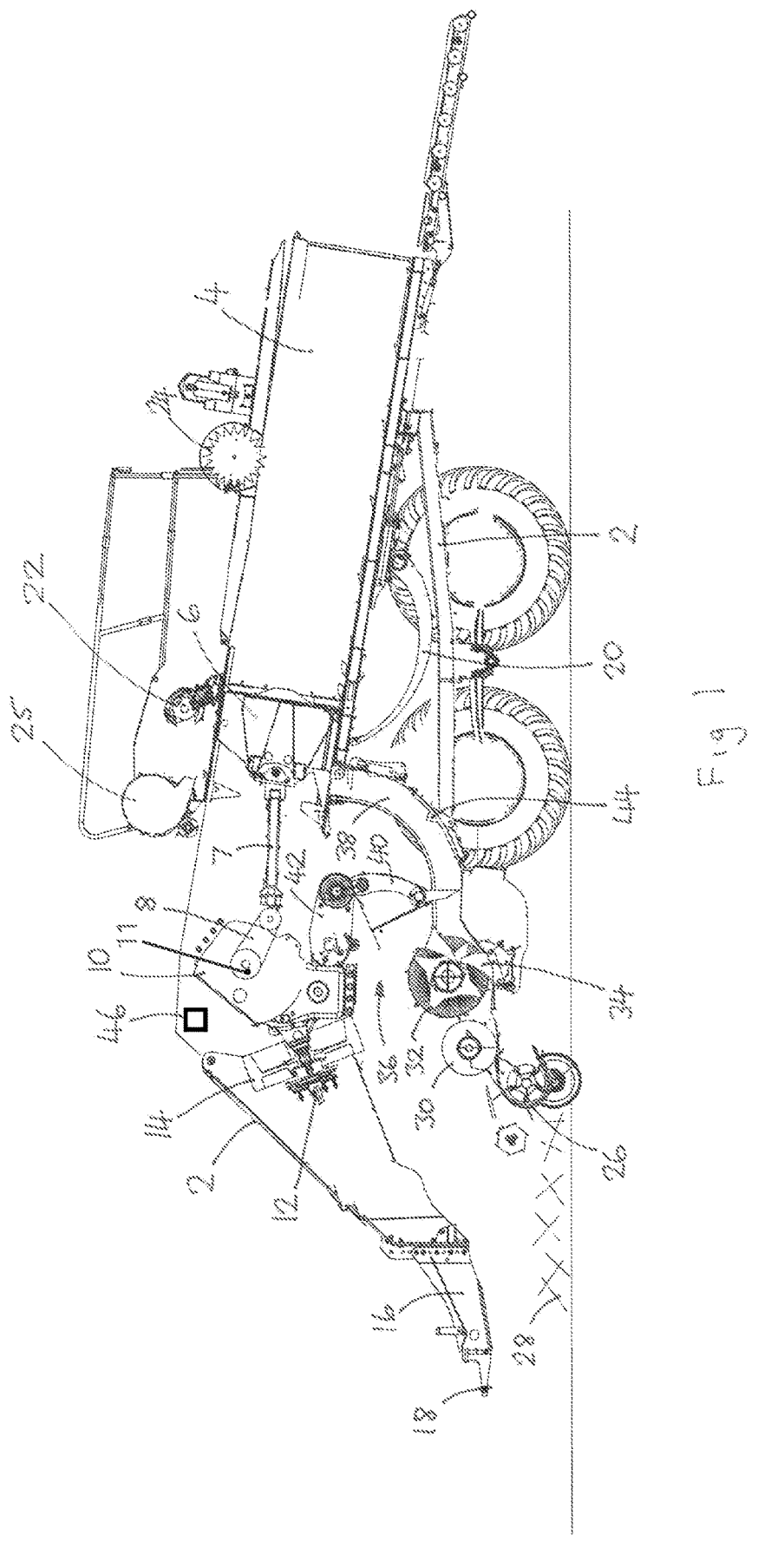
FIG. 1 is a schematic sectional side view of a baler.

A baler according to an exemplary embodiment of the invention is shown in FIG. 1. The baler comprises a support frame 2, which supports a compression chamber 4 having a substantially rectangular cross-section, with an input end into which bale material is fed and an output end from which completed bales are ejected.

A reciprocating plunger 6 is mounted at the input end of the compression chamber 4. The reciprocating plunger 6 is driven in and out of the compression chamber 6 by a plunger drive mechanism comprising a connecting rod 7 and a plunger crank 8 that is mounted on a driving shaft 9 of the main gearbox 10. A driving shaft sensor 11 is provided to sense the rotational position of the driving shaft 9, which determines the position of the reciprocating plunger 6.

The main gearbox 10 is driven from an input shaft 12 that may be connected to the power take off (PTO) of a tractor (not shown). A flywheel 14 is mounted on the input shaft 12. The baler includes a drawbar 16 having a coupling 18 for coupling the baler to a tractor.

The baler includes a binding system for binding a bale that has been formed in the compression chamber 4. The binding system is conventional and comprises a twine needle 20 and a knotting device 22. A sensor 24 may be provided adjacent an opening in the compression chamber 4 for sensing the length of the bale in the compression chamber 4. Optionally, an air blower 25 may be provided for blowing away debris from the knotting device 22 to ensure correct operation thereof.

The baler includes a pick-up device 26 for picking up bale material 28, for example crop material, from a windrow in a field. Optionally, a forwarding rotor 30 and/or a cutting and forwarding rotor 32 and a cutting knife 34 may be provided to feed the bale material from the pick-up device 26 to a feeding system 36 for feeding the bale material to the compression chamber 4.

The feeding system 36 comprises a curved feeding duct 38 (or prechamber), a feeding fork 40 that is configured to transfer the bale material along the feeding duct 38 and into the compression chamber 4, and a feeding fork drive mechanism 41 drives and steers movement of the feeding fork. A feeder gearbox 42 supplies drive to the feeding fork drive mechanism 41. The feeding system 36 may also include one or more sensors 44 that are configured to sense the quantity of bale material in the feeding duct 38 and a command device 46 that controls operation of the baler, including the delivery of drive from the gearbox 42, steering of the feeding fork 40 and operation of a feeding duct lock 47.

Except as described below, the components mentioned above are conventional and will not therefore be described in further detail.

Controlling the Length of the Loading Stroke

Figure 2:
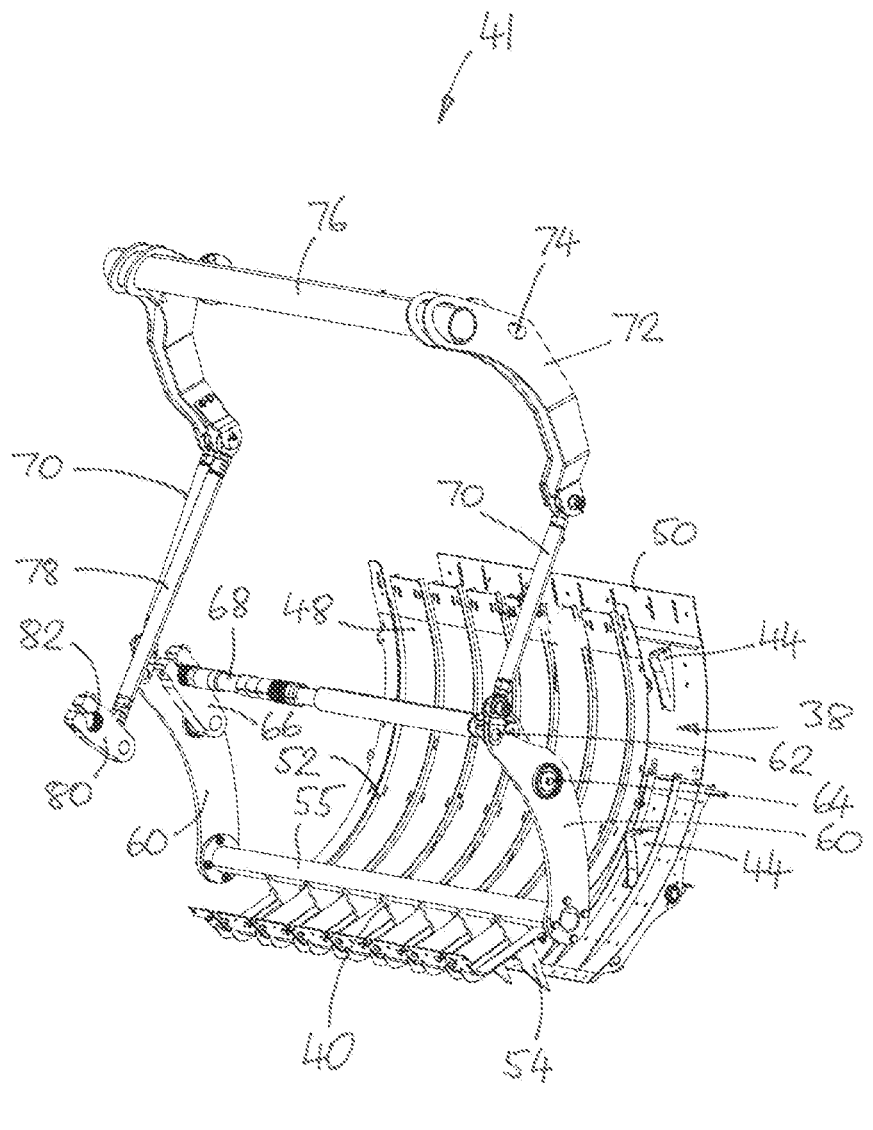
FIG. 2 is an isometric view of a feeding system and feeding fork drive mechanism of the baler.
Figure 3:
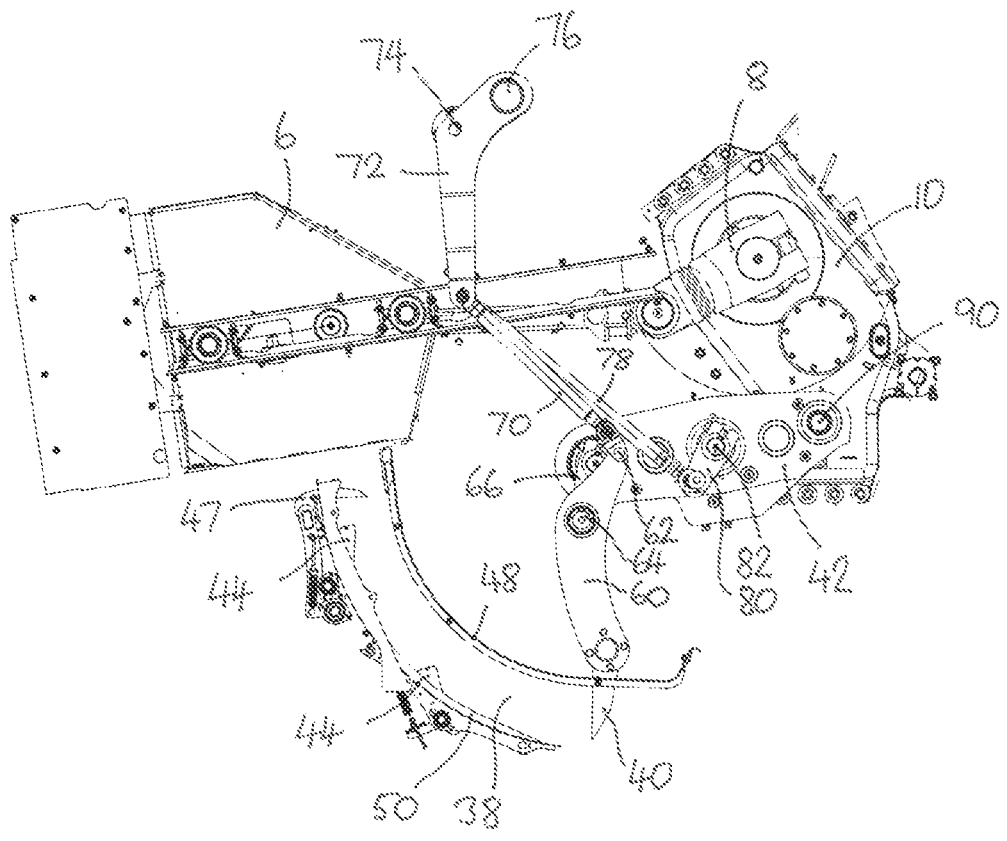
FIG. 3 is a side view of the feeding system and feeding fork drive mechanism.
Figure 4:
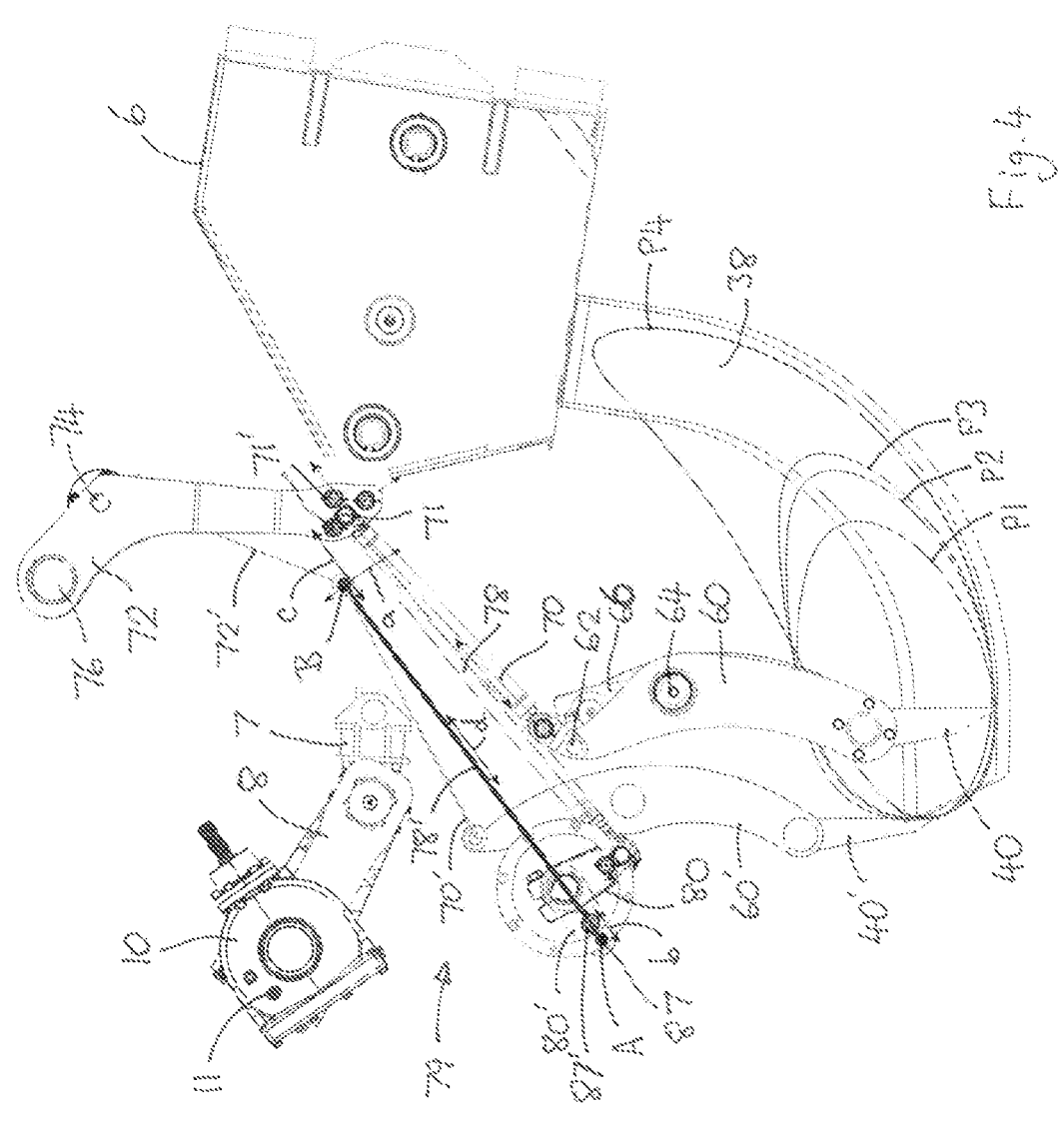
FIG. 4 is a side view of the feeding fork drive mechanism and the plunger drive mechanism of the baler.

The feeding system 36 is shown in more detail in FIGS. 2, 3 and 4. The feeding duct 38 is curved and is provided between a curved inner wall 48 and a curved outer wall 50. A plurality of elongate slots 52 are provided in the inner wall 48 and extend lengthwise along the feeding duct. The sensors 44 are mounted in openings in the outer curved wall 50 and extend into the feeding duct 38 to sense bale material in the feeding duct 38.

The feeding fork 40 comprises a plurality of tines 54 mounted on a support beam 55. The tines 54 are aligned with the slots 52, allowing the tines to extend into and move along the length of the feeding duct 38 from an input end 56 at the lower part of the feeding duct to an output end 58 at the upper part of the feeding duct 38.

The feeding fork 40 is supported by a pair of feeding fork arms 60, which are rigidly attached at their lower ends to opposite ends of the feeding fork support beam 55. Each feeding fork arm 60 includes an upper pivot joint 62 at the upper end of the feeding fork arm 60 and an intermediate pivot joint 64 between the upper and lower ends of the feeding fork arm. Movement of the feeding fork 40 along the feeding duct 38 is steered by the relative movement of the upper and intermediate pivot joints 62, 64.

The intermediate pivot joint 64 of each feeding fork arm 60 is attached to an outer end of a feeding fork crank 66. The inner ends of the two feeding fork cranks 66 are attached to a rotatable feeding fork shaft 68, which is driven from the main input shaft 12 via the main gearbox 10 and the feeder gearbox 42. The feeding fork cranks 66 are configured to rotate with the feeding fork shaft 68 about the longitudinal axis of the shaft 68 so that the intermediate pivot joints 62 follow a circular path centred on the longitudinal axis of the shaft 68.

The upper pivot joint 62 of each feeding fork arm 60 is pivotably connected by a connecting rod, referred to herein as a second steering arm 70, to a lower end of one of a pair of swing arms 72. The swing arms 72 are configured to pivot about a swing arm pivot 74. A swing arm connecting beam 76 connects the upper ends of the swing arms 72 so that they pivot together.

At least one of the swing arms 72 is pivotably connected at its lower end via a first pivot joint 71 and another connecting rod, referred to herein as a first steering arm 78, to a second pivot joint 87 at an outer end of a steering arm crank 80. One or more alternative first pivot joints 71' may optionally be provided on the swing arm 72. Similarly, one or more alternative second pivot joints 87' may optionally be provided on the outer end of a steering arm crank 80. The first steering arm 78 may be connected to any one of the first pivot joints 70,71' and to any one of the second pivot joints 80,80' to adjust the drive connection between the steering arm crank 80 and the swing arm 72. In the following description we will say that the first steering arm 78 extends between a first pivot joint A on the steering arm crank 80 and a second pivot joint B on the swing arm 72.

Optionally, the length of the first steering arm 78 may also be adjusted to adjust the drive connection between the steering arm crank 80 and the swing arm 72.

The steering arm crank 80 is driven from the main input shaft 12 via the main gearbox 10, the feeder gearbox 42 and a clutch mechanism 81, for example a one turn coupling, which is actuated by an actuating arm 92 that acts on an actuator 94. Actuating the one turn coupling 81 causes the steering arm crank 80 to rotate once about the axis of a steering arm shaft 82 each time the one turn coupling is activated. During operation of the baler the actuator 94 is controlled so that during the loading stroke the steering arm crank 80 rotates synchronously with feeding fork crank 66 and during the feeding stroke the steering arm crank 80 remains stationary and only the feeding fork crank 66 rotates.

It is noted that the feeding fork cranks 66 and the steering arm crank 80 are all driven from the main input shaft 12 of the baler, thus avoiding the need for a secondary drive motor to drive one or more of the cranks 66, 80.

Figure 7:
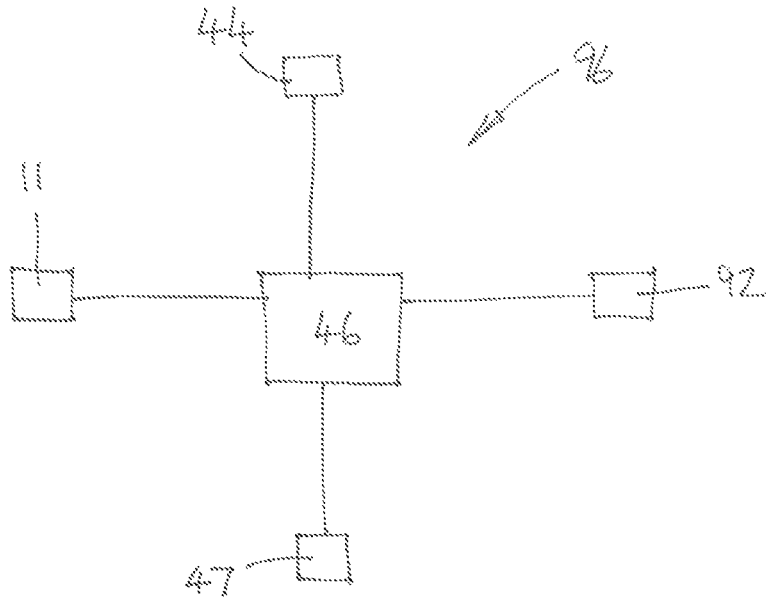
FIG. 7 is a schematic illustration of an electronic control system of the baler.

Operation of the baler may be controlled by the command device 46, which may for example be an electronic controller or a mechanical control device. An example of an electronic control system 96 is illustrated in FIG. 7. The electronic control system 96 includes the command device 46, in this case an electronic controller, which is connected to receive input signals from the driving shaft sensor 11 and the sensors 44 that sense the quantity of bale material in the feeding duct 38. The electronic control system 96 is also connected to the actuator arm 92 to control operation of the one turn coupling actuator 94, and to the feeding duct lock 47. Operation of these components is controlled and synchronised according to the quantity of bale material in the feeding duct 38 and the operational position of the plunger 6.

The feeding fork shaft 68 and the steering arm shaft 82 are both driven by the feeding fork gearbox 42, which is connected to the main gearbox 10 and takes its drive from the main gearbox 10 as shown in FIG. 3.

Rotation of the steering arm crank 80 is transmitted by the first steering arm 78 to the swing arm 72, which causes the swing arm 72 to swing back and forth about the swing arm pivot 74. This movement of the swing arm 72 is transmitted via the two second steering arms 70 to the upper pivot joints 62 of the feeding fork arms 60.

Rotation of the two feeding fork cranks 66 causes the intermediate pivot joints 62 follow a circular path centred on the longitudinal axis of the feeding fork shaft 68.

The relative movement of the upper and lower pivot joints 62, 64 drives the tip of the feeding fork 40, causing it to follow a closed loop path P. As illustrated in FIG. 4 the shape of the closed loop path P can be adjusted by controlling the relative rotations of the steering arm crank 80 and the feeding fork crank 66. Various alternative closed loop paths P1, P2, P3, P4 are shown in FIG. 4. FIG. 4 also illustrates first and second positions of the feeding fork 40, the feeding fork arm 60, the second steering arm 70, the swing arm 72, the first steering arm 78 and the steering arm crank 80 as the feeding fork 40 rotates around a closed loop path. The first position of these components is indicated by the reference numbers 40, 60, 70, 72, 78, 80 and the second position is indicated by the reference numbers 40', 60', 70', 72', 78', 80'.

The first three closed loop paths P1, P2, P3 illustrated in FIG. 4 illustrate the movement of the tip of the feeding fork 40 through three different loading strokes, during which bale material that has been picked up by the pick-up mechanism 26 is loaded into the feeding duct 38 and partially compressed. During the each of these loading strokes the feeding fork 40 is steered in an anticlockwise direction around the closed loop path as depicted in the drawing. Starting from the 9:00 o'clock position as shown by the second position of the feeding fork 40', the feeding fork moves downwards into the feeding duct 38, then forwards through the first position of the feeding fork 40 from the inlet end 56 towards the outlet end 58 of the feeding duct 38. The feeding fork 40 then withdraws from the feeding duct 38 and returns to the starting position as shown by the second position of the feeding fork 40'. It is noted that during the loading stroke the feeding fork moves along only part of the length of the feeding duct 38, from the inlet end 56 towards an intermediate position part way between the inlet end 56 and the outlet end 58. Typically, during the loading stroke the feeding fork 40 moves along about 30% to 60% of the length of the feeding duct 38.

The first three closed loop paths P1, P2, P3 illustrate respectively short, intermediate and long loading strokes, during which the feeding fork moves different distances along the feeding duct 38 from the input end 56 towards the output end 58. By adjusting the length of the loading stroke it is possible to control the degree of pre-compression of the bale material in the feeding duct 38 and/or the position at which the bale material is deposited in the feeding duct 38.

It is noted that the starting position of the feeding fork 40' is substantially the same for all three loading strokes represented by closed loop paths P1, P2, P3. This is important because of the required cooperation between the feeding system and the supply mechanism (the pick-up mechanism 26 and/or the cutting and forwarding rotor 32, if provided).

The end point of the feeding fork during the loading stroke varies according to whether the feeding fork follows the short, intermediate or long loading strokes as represented by the closed loop paths P1, P2, P3 respectively. As noted above, the length of the loading stroke affects the position of the bale material within the feeding duct 38 and/or the degree of pre-compression of the bale material. By adjusting the end point of the loading stroke it is also possible to control the height of the wad of pre-compressed bale material in the compression chamber 4 after it has been transferred into the compression chamber in front of the plunger 6 during the feeding stroke, so as to adjust the degree of filling in the upper and lower parts of the compression chamber 4.

The loading strokes are driven by rotating the steering arm crank 80 and the feeding fork crank 66 simultaneously. As a result of this simultaneous rotation of the steering arm crank 80 and the feeding fork crank 66, the swing arm 72 moves between the first position 72 and the second position 72', and the second steering arm moves between the first position 70 and the second position 70' as illustrated in FIG. 4.

As described in more detail below, it is also possible to adjust the length of the feeding stroke, during which bale material is transferred from the feeding duct 38 into the compression chamber 4.

The length of the loading stroke and/or the feeding stroke, including the end point of the loading stroke and/or the feeding stroke, can be controlled by means of a drive adjustment mechanism 79 that is configured to enable adjustment of the drive connection between the steering arm crank 80 and the swing arm 72, so as to control the length of the loading stroke and/or the feeding stroke. It is generally preferred that the connection between the swing arms 72, the second steering arms 70 and the feeding fork 40 is not adjusted, as this would require a more complicated adjustment mechanism.

The drive adjustment mechanism 79 may include adjustment components for adjusting one or more parts of the drive connection between the steering crank 80 and the upper pivot joint 62 of the feeding fork arm 60, as illustrated by the arrows a, b, c, d in FIG. 4. These adjustments may include, for example, one or more of the following:

a. rotating the pivot joint B on the swing arm 72 in a circumferential direction relative to the pivot joint A (arrow a), b. moving pivot joint A on the steering arm crank 80 in a radial direction relative to the steering arm crank 80 (arrow b), c. moving the pivot joint B on the swing arm 72 in a radial direction relative to the pivot joint A (arrow c), d. adjusting the physical length of the first steering arm 78 between the pivot joint A on the steering arm crank 80 and the pivot joint B on the swing arm 72 (arrow d).

These adjustments may be applied either individually or in combination. For example, the end point of the loading stroke and/or the feeding stroke can be controlled by adjusting the position of pivot joint A and/or B (arrows a, b and/or c), possibly in combination with adjusting the length of the second steering arm (arrow d). The end point of the feeding stroke can be controlled by adjusting the length of the second steering arm 70 (arrow d), possibly in combination with adjusting the position of pivot joint A and/or B (arrows a, b and/or c).

Each of these adjustments to adjust the drive connection between the steering arm crank 80 and the swing arm 72 may be made manually by the operator of the baler by using suitable mechanical adjustment mechanisms (for example, a telescopic adjustment mechanism on the first steering arm 78, and/or alternative pivot points A and B). Alternatively, one or more actuators may be provided that allow the drive connection to be adjusted remotely, for example in response to control signals provided by the operator and/or by an automatic control system.

By controlling the length and end point of the loading stroke it is possible to adjust the amount of pre-compression of the bale material in the feeding duct and/or the amount of material collected on successive loading strokes.

The fourth closed loop path P4 illustrated in FIG. 4 illustrates the movement of the tip of the feeding fork 40 through a feeding stroke, during which bale material that has been deposited and partially pre-compressed in the feeding duct 38 is transferred by the feeding fork 40 from the feeding duct 38 into the compression chamber 4 in front of the plunger 6. During the feeding stroke the feeding fork 40 moves along most of the length of the feeding duct 38 from the input end 56 to the output end 58. This enables it to lift and feed the pre-compressed bale material into the compression chamber 4. Typically, during the feeding stroke the feeding fork 40 moves along about 80% to 100% of the length of the feeding duct 38.

It should be noted that the length of the feeding stroke may also be adjusted by adjusting the drive connection, as described previously.

Controlling the Speed of the Loading Stroke

The present invention also enables control over the speed of the feeding fork 40 during the loading stroke, during which the bale material is loaded into the feeding duct 38 and pre-compressed prior to feeding into the compression chamber 4.

Figure 5:
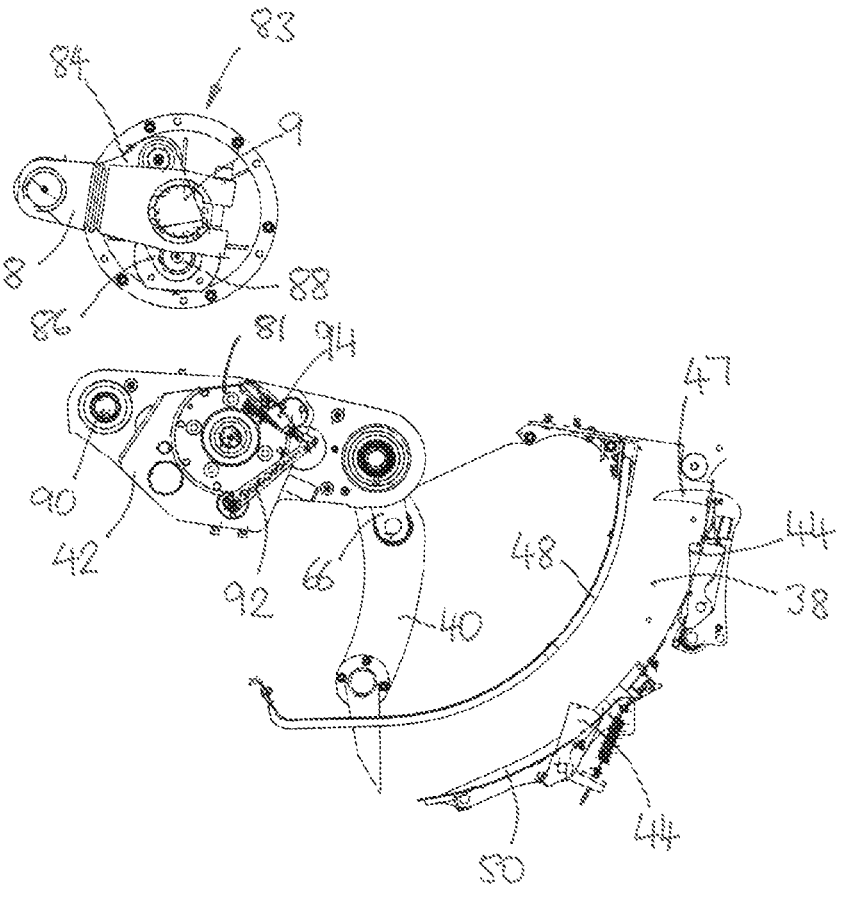
FIG. 5 is a side view of the feeding fork drive mechanism.
Figure 6:
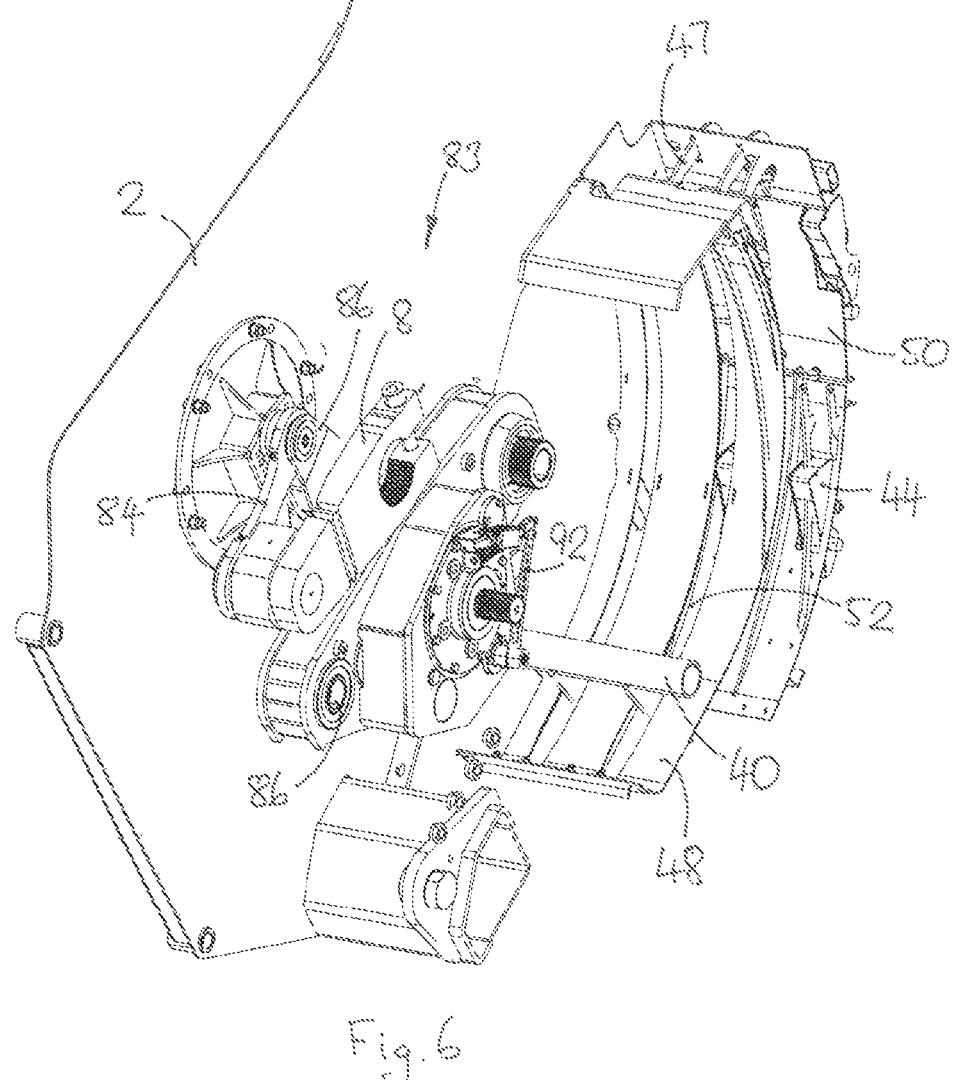
FIG. 6 is an isometric view of the feeding fork drive mechanism.

With reference to FIGS. 5 & 6, the feeding system 36 includes an asynchronous drive mechanism 83 for varying the speed of the feeding fork 40 during the loading and feeding strokes. The asynchronous drive mechanism 83 may comprise an offset drive mechanism as described below or another asynchronous drive mechanism, for example a Cardan joint.

In this embodiment the asynchronous drive mechanism 83 comprises an offset drive mechanism 83 comprising the plunger crank 8 that drives reciprocating movement of the plunger 6. The plunger crank 8, which is mounted on a driving shaft 9 of the main gearbox 10, acts as a driving crank and is connected by a pulling arm 84 to a driven crank 86 that is mounted on a driven shaft 88. The axis of the driven shaft 88 is offset from the axis of the driving shaft 9. As a result of the connection via the pulling arm 84 between the driving crank (plunger crank 8) and the driven crank 86, rotation of the driving shaft 9 drives rotation of the driven shaft 88.

Both shafts 9, 88 rotate at the same number of revolutions per minute but, owing to the offset between the axes of the shafts 9, 88, the instantaneous rotational speed of the driven shaft 88 during each revolution is sometimes faster and sometimes slower than the instantaneous rotational speed of the driving shaft 9. Therefore, when the driving shaft 9 rotates at a uniform rotational speed, the rotational speed of the driven shaft 88 will oscillate between faster and slower values.

The variation in the rotational speed of the driven shaft 88 depends on the amount of offset between the axes of the shafts 9, 88. An adjusting mechanism (not shown) may optionally be provided for adjusting the offset and thereby controlling the variation in the rotational speed of the driven shaft 88.

It is noted that although the asynchronous mechanism introduces a variation in the speed of the feeding fork during different parts of the loading/feeding cycle, it does not affect the timing of the loading/feeding cycle, which remains synchronised with the delivery of bale material from the pick-up mechanism 26 and the reciprocating movement of the plunger 6.

As noted previously, the feeding system runs at two or more times the rate of the plunger so that there will always be multiple strokes of the feeding fork between successive strokes of the reciprocating plunger, including at least one feeding strokes and one or more loading strokes. The asynchronous drive mechanism 83 is configured so that the faster rotational speed of the driven shaft 88 coincides with the loading stroke or strokes and the slower rotational speed of the driven shaft 88 coincides with the feeding stroke. If two or more loading strokes take place successively the faster rotational speed of the driven shaft 88 preferably coincides with the first loading stroke.

As a result of the asynchronous drive, the feeding fork 40 is driven along the feeding duct 38 at a high speed during the loading stroke and at a lower speed during the feeding stroke. The faster loading stroke ensures good preparation of the pre-compressed bale material in the feeding duct 38 by throwing the bale material upwards towards the output end 58 of the feeding duct. This is particularly true if two or more loading strokes take place successively, as the faster first loading stroke throws bale material towards the output end of the bale feeding duct 38 and the slower second loading stroke then compresses more bale material behind the first wad of bale material.

In the present invention, the problem of non-uniform bale formation is addressed by ensuring the correct preparation of pre-compressed bale material in the feeding duct. Correct preparation of pre-compressed bale material is achieved by controlling the shape and/or the speed of the loading stroke to compensate for bale materials having different and variable properties. The invention provides a mechanism for controlling the shape and/or the speed of the loading stroke and makes it possible to achieve good preparation of the pre-compressed bale materials in the feeding duct, thus leading to better-shaped and uniform bales.

The invention claimed is:

1. A square baler comprising:
   a compression chamber,
   a reciprocating plunger configured to compress bale material in the compression chamber to make a square bale, and a feeding system configured to feed bale material into the compression chamber, the feeding system comprising a feeding duct having an input end and an output end, a feeding fork configured to perform a loading stroke to pre-compress bale material in the feeding duct and a feeding stroke to transfer bale material from the feeding duct into the compression chamber, and a drive mechanism for driving movement of the feeding fork, wherein the drive mechanism is adjustable to control at least one of a length and a speed of the loading stroke, and wherein the drive mechanism includes a feeding fork crank and a steering arm crank, the drive mechanism being arranged such that during the loading stroke, the feeding fork crank and a steering arm crank both rotate, and during the feeding stroke, the feeding fork crank rotates and the steering arm crank does not rotate.

2. A square baler according to claim 1, wherein the feeding fork crank is connected directly to the feeding fork and the steering arm crank is connected to the feeding fork through a first steering arm, a swing arm mounted on a swing arm pivot, and a second steering arm.

3. The square baler according to claim 1, wherein the feeding fork crank and the steering arm crank are driven from an input shaft of the square baler.

4. The square baler according to claim 3, wherein the steering arm crank is connected to the input shaft via a clutch mechanism.

5. The square baler according to claim 1, wherein the drive mechanism includes a drive adjustment mechanism for adjusting a drive connection between the steering arm crank and the swing arm to control at least one of length and position of at least one of the loading stroke and the feeding stroke.

6. The square baler according to claim 5, wherein the drive adjustment mechanism comprises adjustment components for adjusting one or more of:

a length of the first steering arm;

a radial position relative to the steering arm crank of a joint between the first steering arm and the steering arm crank;

a radial position relative to the swing arm pivot of a joint between the first steering arm and the swing arm; and a circumferential position relative to the swing arm pivot of the joint between the first steering arm and the swing arm.

7. The square baler according to claim 1, wherein the drive mechanism is configured to drive the feeding fork at a non-uniform speed.

8. The square baler according to claim 7, wherein the drive mechanism is configured to drive the feeding fork faster during the loading stroke than during the feeding stroke.

9. The square baler according to claim 7, wherein the drive mechanism includes an asynchronous drive mechanism configured to convert a uniform input speed into a varying output speed.

10. The square baler according to claim 9, wherein the asynchronous drive mechanism includes an adjustment mechanism for adjusting the variation in the output speed of the asynchronous drive mechanism.

11. The square baler according to claim 10, wherein the asynchronous drive mechanism comprises an offset drive mechanism comprising first and second cranks with offset axes of rotation and a connecting arm that connects the first and second cranks and transmits rotational drive therebetween.

12. The square baler according to claim 11, wherein the adjustment mechanism adjusts the offset between the axes of the first and second cranks to adjust the variation in the output speed of the asynchronous drive mechanism.

13. A square baler comprising:

a compression chamber, a reciprocating plunger configured to compress bale material in the compression chamber to make a square bale, and a feeding system configured to feed bale material into the compression chamber, the feeding system comprising a feeding duct having an input end and an output end, a feeding fork configured to perform a loading stroke to pre-compress bale material in the feeding duct and a feeding stroke to transfer bale material from the feeding duct into the compression chamber, and a drive mechanism for driving movement of the feeding fork, wherein the drive mechanism is adjustable to control at least one of a length and a speed of the loading stroke, wherein the drive mechanism includes an asynchronous drive mechanism configured to convert a uniform input speed into a varying output speed, and wherein the asynchronous drive mechanism comprises an offset drive mechanism comprising first and second cranks with offset axes of rotation and a connecting arm that connects the first and second cranks and transmits rotational drive therebetween.

14. The square baler according to claim 13, wherein the asynchronous drive mechanism includes an adjustment mechanism for adjusting the variation in the output speed of the asynchronous drive mechanism.

15. The square baler according to claim 14, wherein the adjustment mechanism adjusts the offset between the axes of the first and second cranks to adjust the variation in the output speed of the asynchronous drive mechanism.

16. A square baler comprising:

a compression chamber, a reciprocating plunger configured to compress bale material in the compression chamber to make a square bale, and a feeding system configured to feed bale material into the compression chamber, the feeding system comprising a feeding duct having an input end and an output end, a feeding fork configured to perform a loading stroke to pre-compress bale material in the feeding duct and a feeding stroke to transfer bale material from the feeding duct into the compression chamber, and a drive mechanism for driving movement of the feeding fork, wherein the drive mechanism is adjustable to control at least one of a length and a speed of the loading stroke, and wherein the drive mechanism comprises a feeding fork crank that is connected directly to a feeding fork and a steering arm crank that is connected to the feeding fork through a first steering arm, a swing arm mounted on a swing arm pivot, and a second steering arm.

* * * * *